No. 779,195. PATENTED JAN. 3, 1905.
D. B. WILLIAMS.
PROCESS OF TREATING CLAYS.
APPLICATION FILED JULY 2, 1903. RENEWED JULY 18, 1904.
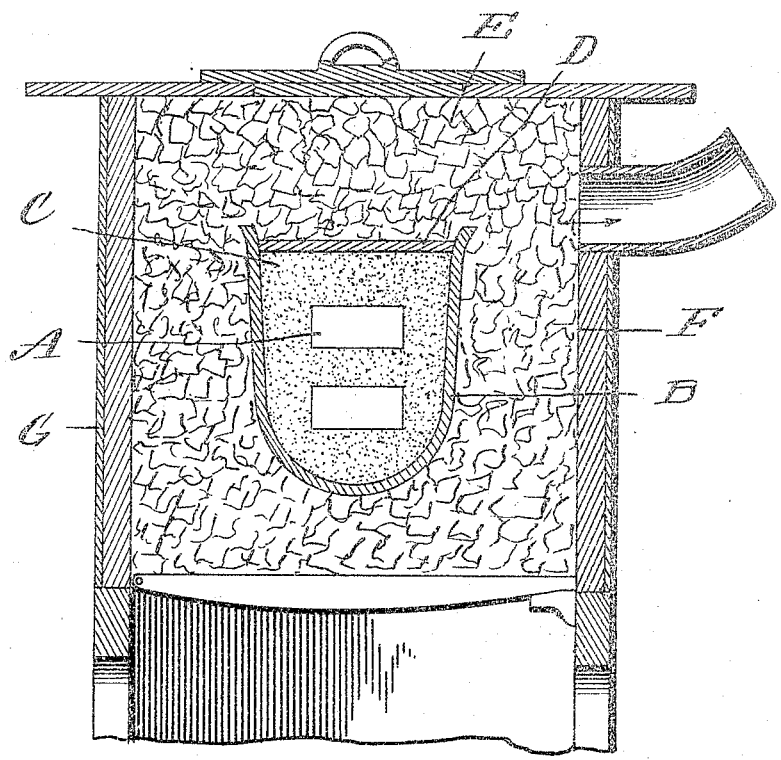
WITNESSES:
W. F. Doyle.
G. S. Roy.
INVENTOR
Dick B. Williams.
BY S. P. Wolhaupter
Attorney No. 779,195.                                        Patented January 3, 1905.

UNITED STATES PATENT OFFICE.

DICK B. WILLIAMS, OF CONNELLSVILLE, PENNSYLVANIA, ASSIGNOR OF ONE-HALF TO JOSEPH R. STAUFFER, OF SCOTTDALE, PENNSYLVANIA.

PROCESS OF TREATING CLAY.

SPECIFICATION forming part of Letters Patent No. 779,195, dated January 3, 1905.

Application filed July 2, 1903. Renewed July 18, 1904. Serial No. 217,120.

*To all whom it may concern:*

Be it known that I, DICK B. WILLIAMS, a citizen of the United States, residing at Connellsville, in the county of Fayette and State of Pennsylvania, have invented certain new and useful Improvements in Processes of Treating Clays, of which the following is a specification.

This invention relates to an improved process for treating clays to produce a highly indurated and refractory product possessing great utility for a variety of commercial purposes and especially adaptable for fire-brick, refractory linings, crucibles, and other articles which are subjected to very high temperatures.

It has been developed by experiment and observation that the specific process contemplated by the present invention effects peculiar results upon clay products of the pure and mixed grades and also possesses the practical and important advantage of converting the inferior and infrequently-used grades of clay, such as blue clay, into a substance capable of withstanding almost an indefinite degree of heat without losing its form or general characteristics, thus rendering the said substance available for the manufacture of articles which are intended to withstand intense heats.

The invention also has in view a process providing for the production of a new indurated or refractory product having all of the properties of what is ordinarily known as "carborundum," with a distinct advantage over the latter of being a solid compact substance which can be produced in any desired form and at a single firing, thus effecting great economy in time.

It is well known that pure and mixed clays have been treated with carbon in divers ways to produce an indurated and refractory product, and it is also well known that various combinations of carbon, silica, and oxygen have been effected with the same end in view. The manufacture of carborundum is an exemplification of the prior art in this direction, which substance results from the reaction between carbon and silica, the latter being conveniently supplied in the form of sand. These known processes, however, involve the thought of mixing together the sand and carbon or clay and carbon or other materials and effecting a fusing together of the mixture to produce the resultant hard substance or product. In the production of these and similar products heretofore recourse has been made to electric furnaces in which the mixed charge is introduced so as to lie within the zone of the current passing between oppositely-located conductors, and it is only the material within the zone of the current which undergoes the chemical change incident to the heating up of the same. Also in some methods heretofore practiced the object has been to provide compounds containing silicon, oxygen, and carbon in chemical combination; but the present invention involves a specific treatment of the clay material that eliminates to a minimum the presence or union of oxygen from extraneous sources and also absolutely avoiding the mixing of the carbon with the clay material which undergoes the indurating or hardening action. It has also been found by experiment that the peculiar product formed by this process can be best produced by the utilization of coke, which in spite of its porosity conducts heat very readily and most effectively evolves the monoxid of carbon, which is depended upon exclusively to secure the desired results. Hence the important and distinctive feature of the process forming the subject-matter of the present invention resides in the fact that the form of carbon employed does not itself become any part of the body of clay material; but the result accomplished is entirely through the action of the coke-gases (principally carbon monoxid) on the clay.

The apparatus employed in carrying out the invention may obviously be of any suitable character in which the essential conditions of the process may be preserved. So for illustrative purposes there is shown in the drawings a diagrammatic figure illustrative of an ordinary form of crucible-furnace presenting perfect conditions for the process.

Referring more specifically to the process, the first step therein is to mold the clay in any desired shape or form according to the particular article that is to be made—that is, the final shape is given to the clay material in the first instance, and, as previously explained, this clay material may be pure clay or a mixture of clay and mica or clay and mica-schist, according to the purpose for which the product is intended, although in all instances the molded form to be treated may be properly said to be of clay material. In fact, the invention is of special importance in treating pure clay, such as the inferior blue clay, which is converted into a high-grade useful product.

After the clay or clay material is molded in the desired shape or form the same is thoroughly dried and the molded form (designated by the letter A in the drawing) is placed in a converting-chamber B, which contains a body of coke C in an amorphous condition—that is, ground or pulverized—so as to compactly fill the chamber B and especially for the purpose of compactly enveloping the molded clay forms A. In setting up the apparatus a quantity of the amorphous coke C is placed in the chamber B, the molded clay form introduced, and then completely covered with the ground or amorphous coke C, so that the latter forms a compact carbon envelop for the clay form. The converting-chamber B may be conveniently, as illustrated, in the form of an ordinary crucible, and after the introduction of the clay forms and the embedding thereof in the amorphous coke C the lid D of the crucible is placed in the top thereof, and the latter is next completely surrounded at the top, bottom, and sides by a fuel envelop or covering of the ordinary broken or fuel coke E. This fuel envelop or covering E preferably completely fills the fire-chamber F of a closed type of furnace G and constitutes a perfect coke seal for the converting-chamber or crucible B and positively prevents oxygen entering into the converter or crucible B from the outside thereof. After thus arranging the molded forms the fuel is fired and the firing continued for about three hours, which has ordinarily been found sufficient to completely convert the molded clay forms into the peculiar indurated and refractory product contemplated by the invention.

I have not been able to determine with definiteness from the results of my experiments the exact chemical action which takes place by subjecting the molded clay forms to treatment in a highly-heated sealed chamber while completely enveloped in a body of amorphous coke; but by reason of the complete exclusion of oxygen from extraneous sources the clay body is converted into a dark hard substance exclusively through the action of the coke-gases. The principal indurating-gas evolved by this process is carbon monoxid, sometimes termed "carbon protoxid." This gas is well known for its importance in many metallurgical operations on account of the power it possesses at high temperatures of taking away oxygen from many compounds containing that element, and while in the present case it is not understood that a reducing action takes place yet it is believed that on account of this property of carbon monoxid a peculiar chemical combination is effected between the silicates and the carbon, with a tendency to prevent any combinations with oxygen. Furthermore, by reason of completely surrounding the closed converting-chamber or crucible by a fuel envelop of coke carbon monoxid completely surrounds the crucible, and particularly at the lid or cover thereof, so that there is no tendency of the monoxid within the converting-chamber or crucible to be converted into the dioxid at or about the lid, which has been found to occur when the converting-chamber or crucible B was heated in an open furnace and with the lid unsecured. Under such conditions, which have been experimented with at large, it has been found that the product produced is very inferior and does not possess either the appearance, characteristics, or properties of that produced by heating the molded form in a sealed chamber containing amorphous coke and itself surrounded by an envelop of fuel-coke. Each and all of these conditions are regarded as important to secure the product in its best form. In further explanation of the characteristics of the product treated by the process explained it should be stated that the clay when taken from the furnace has lost all resemblance to its former condition. It will stand any known heat, is absolutely unaffected by acids or alkalies, is harder than the hardest stone, as it cannot be cut down with an emery-wheel, while, on the other hand, being of such hardness as to cut glass better than a diamond. As already indicated, it has all the properties of carborundum, while being more quickly made and more readily produced in any desired form.

The ordinary usages of the product are many. It possesses special utility as a fire-brick, as metal will not slag to it, and its qualities of endurance are infinitely greater, and fire-brick can be produced from this product with much greater economy than now prevails on account of the shortness of time required to produce the same. This is also of importance in using the product for making crucibles. It has also been found to make an excellent oil-stone without wear. As an artificial-stone product it can be used in any way, and it has been found that by regulating the grain or grade of the clay or mixture it becomes a practical and almost indestructible medium for the purpose of grinding for such purposes as grindstones and emery-wheels are now used.

As a part of the process it should be further explained that during the treatment the amorphous coke reaches a high degree of incandescence and maintains such incandescence, yet without mixing with or adhering to the clay form in the slightest degree, thus evidencing the fact that the action upon the clay form results exclusively from the coke-gas.

From the foregoing it is thought that the essential features of the process and the product produced thereby will be apparent without further description.

While the exact chemical composition of the product has not yet been definitely determined, the experimental analyses so far made show that the same is markedly deficient in carbons.

Having thus described the invention, what is claimed, and desired to be secured by Letters Patent, is—

1. A process for treating clays, which consists in subjecting a molded natural clay form to the action of an incandescent body of amorphous carbon while enveloping the form and confined in a sealed chamber.

2. A process for treating clays, which consists in subjecting a dried molded natural clay form to the action of an incandescent envelop of amorphous coke surrounding the form and confined in a sealed chamber.

3. A process for treating clays which consists in first molding and drying natural clay material, then embedding the molded form in an envelop of amorphous coke confined in a closed chamber, and finally firing said closed chamber within a closed furnace to bring the envelop of amorphous coke to an incandescent condition.

4. A process for treating clays which consists in first molding and drying natural clay material, then embedding the molded form in an envelop of amorphous coke sealed within a closed chamber, completely surrounding the sealed chamber with an envelop of fuel-coke and finally firing the latter to bring the confined amorphous coke to an incandescent condition and maintaining it in such condition until the clay form has been converted into the hardened product.

5. An indurated clay product consisting of a body of natural clay material whose constituent elements are changed by chemical combination through the action of coke-gas while the material is held in a compact incandescent envelop of amorphous carbon.

6. A process for treating clays which consists in subjecting a natural clay, while sealed from extraneous sources of oxygen, to the exclusive action of the gas evolved from a heated body of carbon.

7. A process for treating clays which consists in subjecting a dried natural clay body to the action of gas from an incandescent body of coke in physical contact with the clay and covering the same.

8. An indurated clay product consisting of a body of natural clay whose constituent elements are changed by chemical combination through the exclusive action of the gas evolved from a highly-heated body of carbon.

In testimony whereof I affix my signature in presence of two witnesses.

DICK B. WILLIAMS.

Witnesses:
H. A. CROW,
MARIE HOUCK.